(12) United States Patent
Webb et al.

(10) Patent No.: US 10,514,124 B2
(45) Date of Patent: Dec. 24, 2019

(54) PLUG WITH HANDLE

(71) Applicant: Mueller Industries, Inc., Memphis, TN (US)

(72) Inventors: John Webb, Moreville, MS (US); Michael Baum, Guntown, MS (US); Christie Shumpert, Fulton, MS (US); Robert Merrill Sutton, Milton, GA (US); Christopher Charles Saylor, Waxhaw, NC (US); Kenneth Mark Shane, Concord, OH (US); Daniel J. Steffan, Erie, PA (US)

(73) Assignee: Mueller Industries, Inc., Memphis, TN (US)

( * ) Notice: Subject to any disclaimer, the term of this patent is extended or adjusted under 35 U.S.C. 154(b) by 0 days.

(21) Appl. No.: 15/956,113

(22) Filed: Apr. 18, 2018

(65) Prior Publication Data
US 2018/0306370 A1    Oct. 25, 2018

Related U.S. Application Data

(60) Provisional application No. 62/487,717, filed on Apr. 20, 2017.

(51) Int. Cl.
*F16L 55/11*        (2006.01)
*B65D 39/04*       (2006.01)

(52) U.S. Cl.
CPC ................................ *F16L 55/1141* (2013.01)

(58) Field of Classification Search
CPC ....... B65D 39/04; B65D 41/28; Y10S 215/03; F16L 55/1141; F16L 55/11
USPC ..... 138/89; 215/355, 354, DIG. 3, 296, 305, 215/358
See application file for complete search history.

(56) References Cited

U.S. PATENT DOCUMENTS

| | | | | |
|---|---|---|---|---|
| 1,946,981 | A * | 2/1934 | Lower | B65D 41/225 |
| | | | | 215/320 |
| 2,704,100 | A * | 3/1955 | Freeman | B65D 41/225 |
| | | | | 215/235 |
| 2,746,632 | A * | 5/1956 | Bramming | A47J 41/0011 |
| | | | | 215/270 |
| 3,842,790 | A * | 10/1974 | Clark | B65D 39/04 |
| | | | | 215/228 |
| 4,295,572 | A * | 10/1981 | Percarpio | A61B 5/15003 |
| | | | | 215/247 |
| 5,385,253 | A * | 1/1995 | Scharf | B65D 39/04 |
| | | | | 215/296 |
| 6,082,410 | A * | 7/2000 | Pohar | B65D 59/02 |
| | | | | 138/89 |

(Continued)

*Primary Examiner* — Patrick F Brinson
(74) *Attorney, Agent, or Firm* — Harness, Dickey & Pierce, P.L.C.

(57) ABSTRACT

A plug for sealing an interior of a tube and including a cylindrical body having a first end that is open and includes an annular surface, and a second end that is closed by a conical end wall. The cylindrical body having a plurality of ribs that are configured to engage the interior of the tube and provide a seal between the plug and the interior of the tube. The plug also includes a handle unitary with the cylindrical body that extends from the annular surface. The handle has a cylindrical inner surface that is coextensive with an interior surface of the cylindrical body and an outer surface that is coextensive with an exterior surface of the cylindrical body.

8 Claims, 4 Drawing Sheets

(56) References Cited

U.S. PATENT DOCUMENTS 8,747,406 B2 * 6/2014 Schulz ............... A61B 17/1659
606/86 R

* cited by examiner

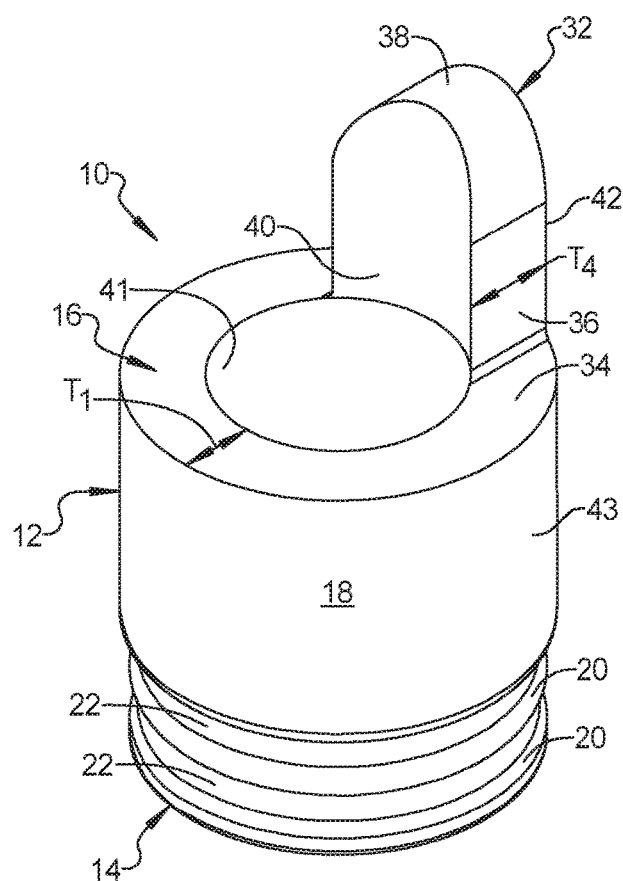
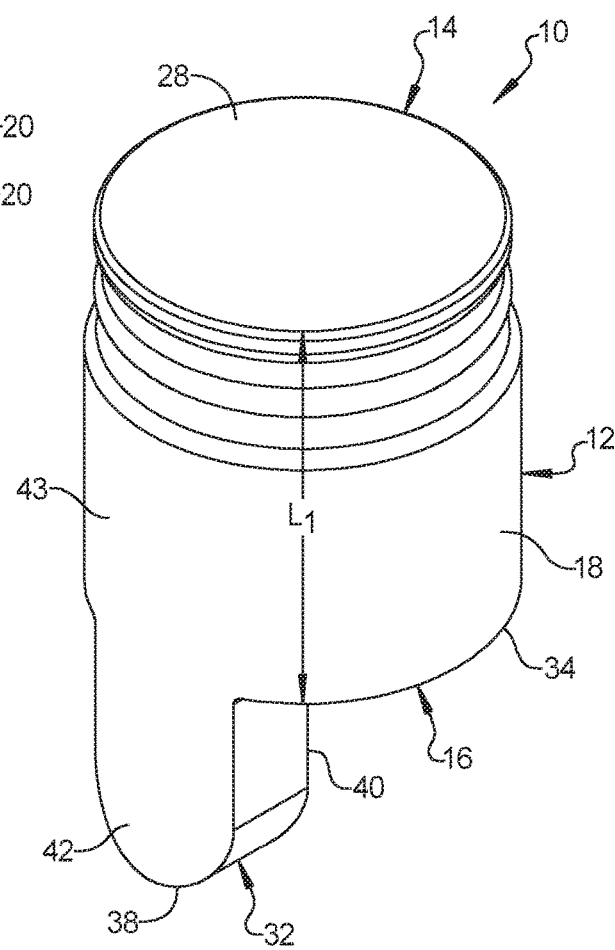
FIG 1
FIG 2

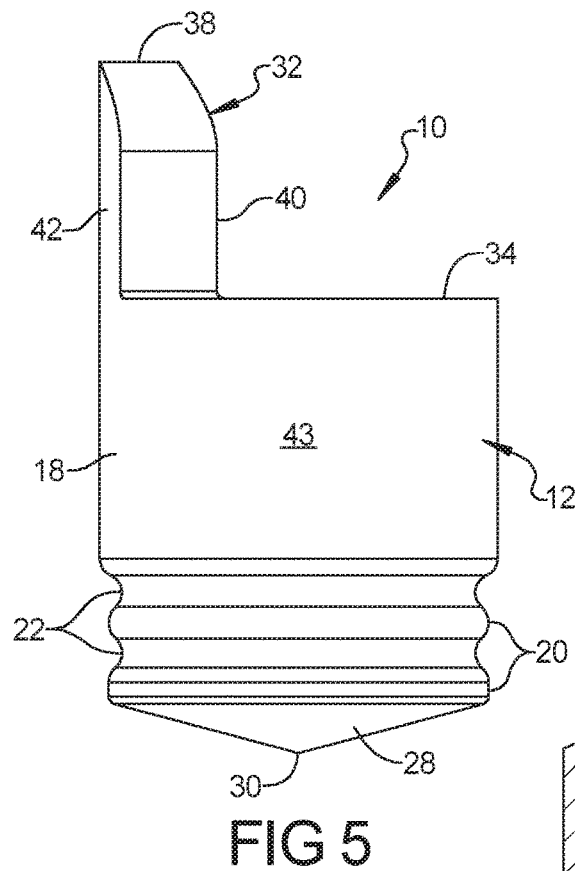
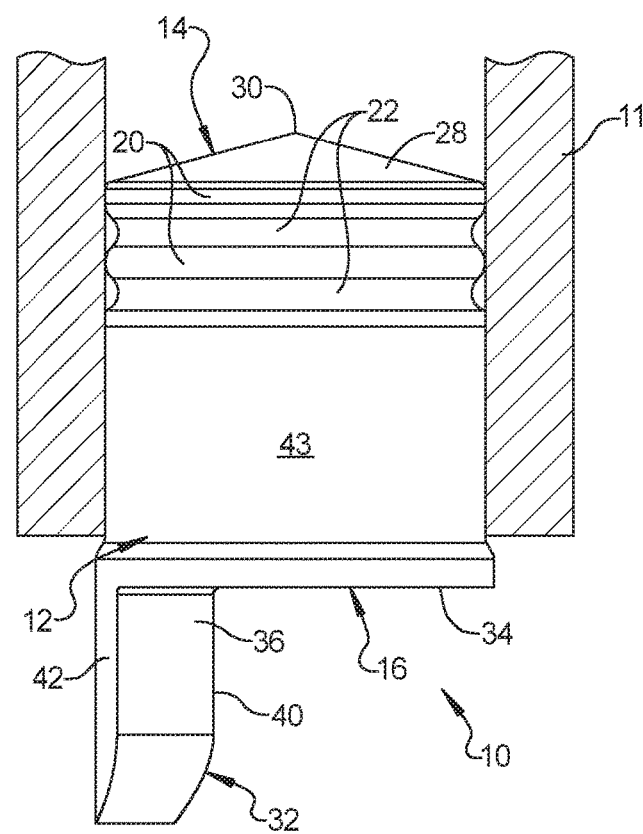

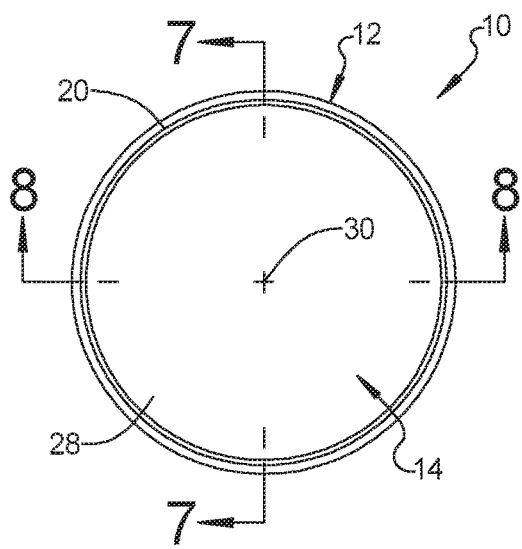
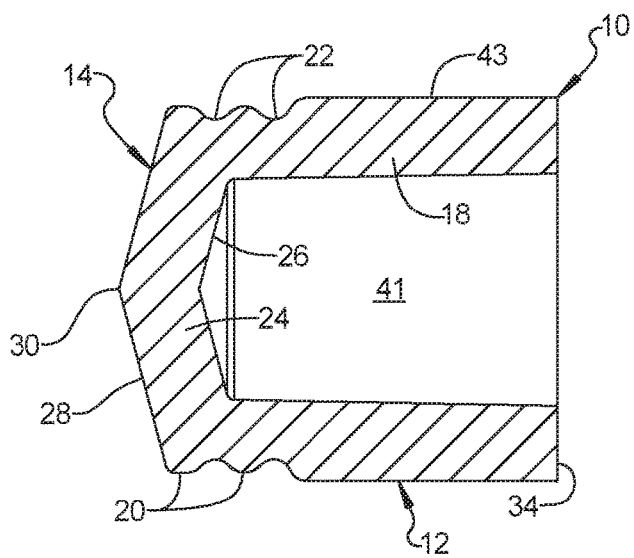
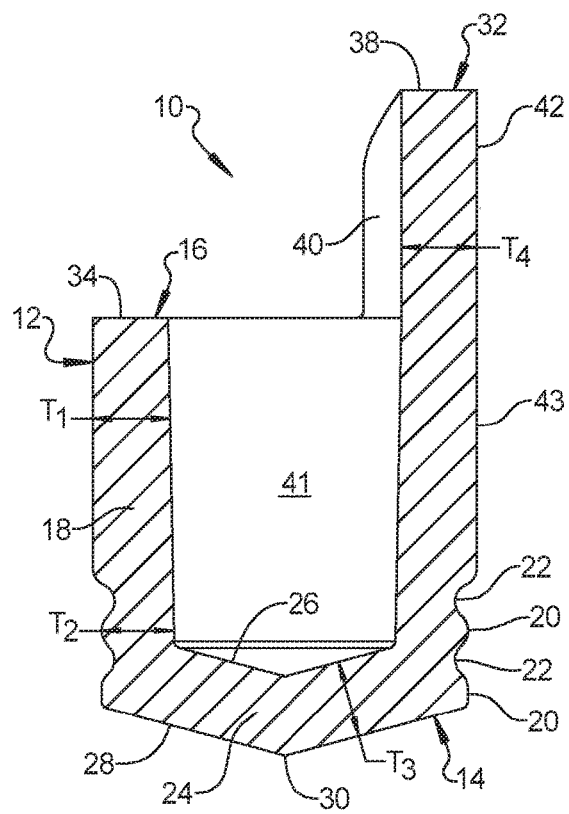

PLUG WITH HANDLE

CROSS-REFERENCE TO RELATED APPLICATIONS

This application claims the benefit of U.S. Provisional Application No. 62/487,717 filed on Apr. 20, 2017. The entire disclosures of the above application are incorporated herein by reference.

FIELD

The present disclosure relates to a plug with a handle for sealing a tube.

BACKGROUND

This section provides background information related to the present disclosure which is not necessarily prior art.

In fluid systems having tubes, such as air conditioning and refrigeration systems, it is sometimes important that the tubes be maintained in a substantially clean condition that is free from contamination by particles and fluids such as moisture. In general, during production of the tubes, the tubes are cleaned. Before the tubes are assembled into the fluid system, however, the tubes may become contaminated during storage or transport thereof. It is then necessary to re-clean the tubes before assembly into the fluid system, which is undesirable in that additional time and cost are associated with assembling the fluid system.

SUMMARY

This section provides a general summary of the disclosure, and is not a comprehensive disclosure of its full scope or all of its features.

The present disclosure provides a plug for sealing an interior of a tube and including a cylindrical body having a first end that is open and includes an annular surface, and a second end that is closed by a conical end wall. The cylindrical body having a plurality of ribs that are configured to engage the interior of the tube and provide a seal between the plug and the interior of the tube. The plug also includes a handle unitary with the cylindrical body that extends from the annular surface. The handle has a cylindrical inner surface that is coextensive with an interior surface of the cylindrical body and an outer surface that is coextensive with an exterior surface of the cylindrical body.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a perspective view of a plug according to a principle of the present disclosure;

FIG. 2 is an inverted perspective view of the plug illustrated in FIG. 1;

FIG. 5 is another side-perspective view of the plug illustrated in FIG. 1;

FIG. 6 is a bottom-perspective view of the plug illustrated in FIG. 1;

FIG. 7 is a cross-sectional view of the plug along line 7-7 of FIG. 6;

FIG. 8 is a cross-sectional view of the plug along line 8-8 of FIG. 6; and

FIG. 9 illustrates the plug of FIG. 1 inserted into a tube, according to a principle of the present disclosure.

Corresponding reference numerals indicate corresponding parts throughout the several views of the drawings.

DETAILED DESCRIPTION

Example embodiments will now be described more fully with reference to the accompanying drawings.

The present disclosure provides a plug for sealing a tube to maintain a clean state of the tube. As noted above, tubes used in various fluid systems may be required to be in a substantially clean state when used in fluid systems such as, for example, air conditioning and refrigeration systems. In this regard, after manufacture of a tube, the tube may be cleaned using a nitrogen gas that purges the tube of any contaminants or fluid (e.g., moisture) that may be present within an interior of the tube. After purging the tube with the nitrogen gas, one or more plugs according to the present disclosure may be inserted into the interior of the tube at an end or ends thereof to seal the tube. In this manner, the tubes are sealed from re-contamination by particles, debris, or fluids. Moreover, a portion of the nitrogen used to purge the tube may be maintained within the tube, which further assists in maintaining a clean state of the tube before assembling the tubes into the fluid system, and also serves as an indicator that the tube has not been opened since manufacture thereof.

Figure 3:
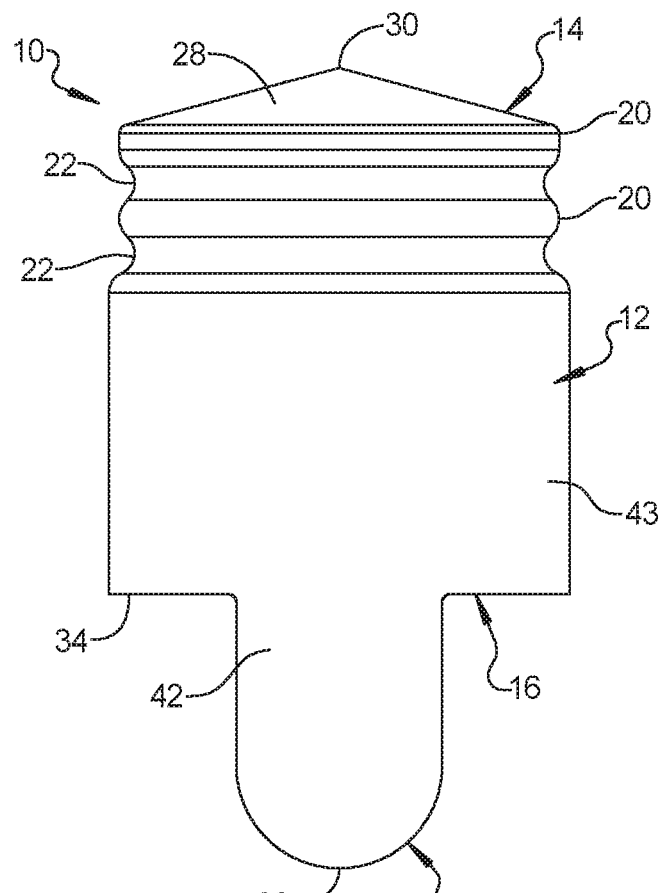
FIG. 3 is a side-perspective view of the plug illustrated in FIG. 2.
Figure 4:
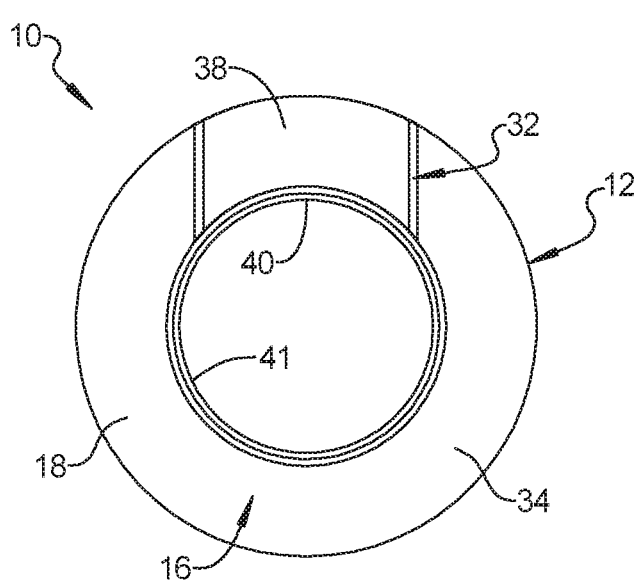
FIG. 4 is a top-perspective view of the plug illustrated in FIG. 1.

FIGS. 1-9 illustrate a plug 10 according to a principle of the present disclosure. Plug 10 includes a cylindrical body 12 having a length L1 that extends between a first or closed end 14 and a second or open end 16. At second or open end 16, cylindrical body 12 includes a wall 18 having a substantially constant first thickness T1. At first or closed end 14, cylindrical body 12 radially narrows such that a second thickness T2 of wall 18 is decreased, and includes a plurality of ribs 20 that extend circumferentially around body 12.

Ribs 20 are unitary with body 12 and are configured to act as a sealing feature between an interior surface of a tube 11 that is being sealed with plug 10 (FIG. 9). In other words, ribs 20 are configured to function like an O-ring, but eliminate the need for an O-ring that is separate and apart from body 12. Ribs 20 are separated by annular recesses 22. Although ribs 20 eliminate the need for a separate O-ring, it should be understood that the present disclosure contemplates configurations where O-rings may be seated in annular recesses 22 to provide additional sealing between plug 10 and the tube 11, if desired.

An end wall 24 of cylindrical body 12 closes first end 14. End wall 24 includes an interior surface 26 and an exterior surface 28 that are each conically shaped to provide, on exterior surface 28, an apex or nose 30. By having end wall 24 be conically shaped, plug 10 is more easily inserted into tube 11. End wall 24 has a thickness T3 that is substantially equal to first thickness T1 of wall 18, and thickness T3 is substantially the same throughout an entirety of end wall 24. A thickness T3 that is substantially equal to thickness T1 of wall 18 increases robustness of end wall 24 that assists in preventing end wall 24 from rupturing and allowing contaminants to enter the tube 11.

A robust seal is established between plug 10 and the tube 11 when plug 10 is inserted into tube 11, which prevents contaminants such as particles or fluid from entering the tube 11. When the tubes 11 are to be assembled into a fluid system, however, plug 10 must be removed from the tube 11. Plug 10, therefore, includes a projection or handle 32 that extends from an annular surface 34 of second end 16 of cylindrical body 12. Handle 32 is configured to be grasped by a user to remove plug 10 from the tube 11.

Handle 32 has a thickness T4 that is substantially equal to thickness T1 of wall 18, which configures handle 32 to be resistant from rupturing when being grasped to remove plug 10 from the tube 11. A base 36 of handle 32 is proximate and unitary with wall 18 and a terminal end 38 of handle 32 is located distal from annular surface 34. As illustrated, terminal end 38 may be arch-shaped or curved. It should be understood, however, that terminal end 38 does not necessarily require being arch-shaped or curved. Handle 32 is unitary with cylindrical body 32. Handle 32, therefore, includes an inner surface 40 that is cylindrically shaped and co-extensive with an inner surface 41 of cylindrical body 12, and an outer surface 42 that is cylindrically shaped and co-extensive with an outer surface 43 of cylindrical body 12.

Plug 10 may be formed of any resilient material known to one skilled in the art. Preferably, plug 10 is formed from a resilient polymeric material, a resilient rubber material, or a resilient thermoplastic elastomer material. The material used to manufacture plug 10 may include a colorant such as, for example, a white colorant or an orange colorant to provide increased visibility for plug 10. Although plug 10 is formed from a resilient material, it should be understood that the material that is selected to form plug 10 should have a rigidity that prevents the seal between plug 10 and the tube 11 from being broken upon an inadvertent force being applied to handle 32. For example, if a force is applied to outer surface 42 of handle 32 that pushes handle 32 in a radially inward direction, the material should be rigid enough to withstand this force and prevent the seal between plug 10 and the tube 11 from being broken. The thickness T1 and T4 of wall 18 and handle 32 is also selected to assist in this manner.

The dimensions of plug 10 can be varied dependent on the specific application selected. That is, the dimensions of plug 10 can be selected based on the diameter of the tube 11 that is to be sealed. When plug 10 is for sealing a tube 11 that is used in a fluid system such as an air condition or refrigeration tube, however, the tubes 11 may have an inner diameter that ranges between 15 and 25 mm. When such a tube 11 is selected, the length L1 of cylindrical body 12 of plug 10 is preferably in the range of 20 mm to 30 mm, a length L2 of handle 32 is preferably in the range of 10 to 15 mm, and thicknesses T1, T3, and T4 are preferably in the range of 6 mm to 10 mm, and more preferably in the range of 7.5 mm to 8.5 mm. A diameter of cylindrical body 12 should be slightly greater than that of the tube 11 such that when plug 10 is inserted into tube 11, cylindrical body 12 may slightly compress to provide a robust seal between plug 10 and tube 11. Regardless, inasmuch as the dimensions can be varied dependent on the specific application selected, one skilled in the art will readily acknowledge and appreciate that the above-noted dimensions are only exemplary.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A plug for sealing an interior of a tube, comprising:
    a cylindrical body extending longitudinally from a first end that is open and includes an annular surface to a second end that is closed by a conical end wall, the cylindrical body having a length that extends between the first end and the second end of the cylindrical body, the cylindrical body having an interior surface with a first radius, the cylindrical body having a plurality of ribs that are configured to engage the interior of the tube and provide a seal between the plug and the interior of the tube, the ribs being located proximate the second end and unitary with the cylindrical body, the ribs each extending about an entire circumference of the cylindrical body, and the ribs being separated by annular recesses; and
    a handle unitary with the cylindrical body that extends longitudinally from the annular surface in a direction that is parallel to the length of the cylindrical body, the handle having a semi-cylindrical inner surface that is coextensive with the interior surface of the cylindrical body and an outer surface that is coextensive with an exterior surface of the cylindrical body,
    wherein the semi-cylindrical inner surface of the handle has a second radius that is equal to the first radius of the interior surface of the cylindrical body.

2. The plug according to claim 1, wherein a thickness of a wall of the cylindrical body is equal to a thickness of the conical end wall.

3. The plug according to claim 1, wherein a thickness of a wall of the cylindrical body is equal to a thickness of the handle.

4. The plug according to claim 1, wherein a thickness of a wall of the cylindrical body including the ribs is less than a thickness of the wall at a location proximate the handle.

5. The plug according to claim 1, wherein the cylindrical body is formed of a resilient polymeric or rubber material.

6. The plug according to claim 1, wherein the handle is formed of a rigid material.

7. The plug according to claim 1, wherein the length of the cylindrical body equals a first length and the handle has a second length that runs parallel to the first length of the cylindrical body.

8. The plug according to claim 7, wherein the first length of the cylindrical body is longer than the second length of the handle.

* * * * *